United States Patent
Co (10) Patent No.: US 9,882,914 B1
(45) Date of Patent: Jan. 30, 2018

(54) SECURITY GROUP AUTHENTICATION (71) Applicant: Workday, Inc., Pleasanton, CA (US)

(72) Inventor: Christopher W. Co, San Leandro, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 14/631,644

(22) Filed: Feb. 25, 2015

(51) Int. Cl.
*H04L 29/06* (2006.01)

(52) U.S. Cl.
CPC ............ *H04L 63/105* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 8,752,183 | B1 * | 6/2014 | Heiderich | G06F 21/577 726/22 |
| 9,137,228 | B1 * | 9/2015 | Newstadt | H04L 63/08 |
| 2007/0150480 | A1 * | 6/2007 | Hwang | G06Q 10/00 |
| 2007/0199068 | A1 * | 8/2007 | Russinovich | G06F 9/468 726/16 |
| 2008/0065895 | A1 * | 3/2008 | Liu | H04L 63/0861 713/176 |
| 2008/0189788 | A1 * | 8/2008 | Bahl | G06F 21/577 726/25 |
| 2009/0165125 | A1 * | 6/2009 | Brown | G06F 21/31 726/21 |
| 2011/0307957 | A1 * | 12/2011 | Barcelo | G06F 21/552 726/25 |
| 2012/0039323 | A1 * | 2/2012 | Hirano | H04W 36/385 370/338 |
| 2012/0137374 | A1 * | 5/2012 | Tarulli | G06F 19/323 726/28 |
| 2012/0184242 | A1 * | 7/2012 | Li | H04L 63/0815 455/406 |
| 2013/0083725 | A1 * | 4/2013 | Mallya | H04L 63/20 370/328 |
| 2013/0125211 | A1 * | 5/2013 | Cashman | H04L 63/08 726/4 |
| 2014/0172808 | A1 * | 6/2014 | Burge | G06F 21/604 707/694 |
| 2015/0089585 | A1 * | 3/2015 | Novack | H04L 63/08 726/3 |
| 2015/0242605 | A1 * | 8/2015 | Du | G06F 21/32 726/7 |

* cited by examiner

*Primary Examiner* — Michael R Vaughan
*Assistant Examiner* — Richard A McCoy
(74) *Attorney, Agent, or Firm* — Van Pelt, Yi & James LLP (57) ABSTRACT

A system for security group authentication comprises an interface, an authentication level determiner, and an authenticator. The interface is for receiving a request from a user to perform an action. The authentication level determiner is for determining that a current authentication level for the user is not adequate for the action. The authenticator is for providing a request to authenticate a new authentication level to the user. The current authentication level and the new authentication level are associated with the user using a security group.

12 Claims, 6 Drawing Sheets

Security Group Table

| Security Group | Allowed Networks | Allowed Authenticaton Types | Access Restrictions | Initial Login |
|---|---|---|---|---|
| Database Users | Corporate Network | Single Sign-On; Username/ Password | Database Reads; Employee Self-Service | Yes |
| | Home Network | Username/ Password Plus Two-Factor | Employee Self-Service | Yes |
| Database Admins | Corporate Network | Single Sign-On | Database Reads; Employee Self-Service | Yes |
| | | Username/ Password | No Restrictions | No |
| | Home Network | Username/ Password | Database Reads; Employee Self-Service | Yes |
| | | Username/ Password Plus Two-Factor | Database Reads; Employee Self-Service; Basic Administration | No |

SECURITY GROUP AUTHENTICATION

BACKGROUND OF THE INVENTION

An enterprise software system including an object-based database receives requests for actions from a wide set of users. Different users have different access privileges based on their status (e.g., a regular user, a systems administrator, a software system developer, etc.), authentication type, network the user is connecting from, etc. Typically, the higher the access privilege, the more requirements there are for authentication. A user with a high level privileges may want to only do tasks requiring a low level of authentication which has associated with it a simple level of authentication. However, because the user has high level privilege, the user is burdened with the more onerous authentication requirements associated with the high level privileges.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for security group authentication is disclosed. In some embodiments, the system for security group authentication comprises an interface for receiving a request from a user to perform an action; an authentication level determiner for determining that a current authentication level for the user is not adequate for the action; and an authenticator for providing a request to change to a new authentication level to the user, wherein the current authentication level and the new authentication level are associated with a security group associated with the user.

In some embodiments, a system for security group authentication enables a user to login at a low level of authentication and then, only on requesting an action requiring a higher level of authentication is the higher level of authentication requested from the user.

In some embodiments, a system for security group authentication comprises an authentication server including a security group table. The security group table comprises a set of security group entries describing security groups. Each system user is associated with one or more security groups. Each security group entry comprises a set of allowed networks (e.g., networks from which a user associated with the security group is allowed to login). Each security group is associated with a set of allowed authentication types (e.g., allowed modes of authentication e.g., username and password, single sign-on authentication, certificate authentication, required two-factor authentication, etc.). In some embodiments, users associated with a security group are allowed to perform authentication using any of the set of allowed authentication types. In some embodiments, allowed authentication types of the set of allowed authentication types are associated with networks of the set of allowed networks (e.g., a user is only allowed to use authentication types associated with the network of the set of allowed networks that the user is using to login). Each security group is further associated with a set of access restrictions. In various embodiments, access restrictions describe one or more of the following: limits to the allowed access of the user, actions not available to the user, or any other appropriate description. In various embodiments, access restrictions are associated with one or more allowed networks and/or one or more allowed authentication types (e.g., a user encounters different access restrictions based on the network used for login and on the authentication type). In some embodiments, in the event that a user attempts to perform an action not available to the user with the current set of access restrictions, but available in a set of access restrictions associated with a different authentication type, the user is prompted to authenticate using the different authentication type. In some embodiments, some sets of access restrictions are available to the user upon initial login and some sets of access restrictions are only available to the user by upgrading access (e.g., through a second authentication) after initial login.

Figure 1:
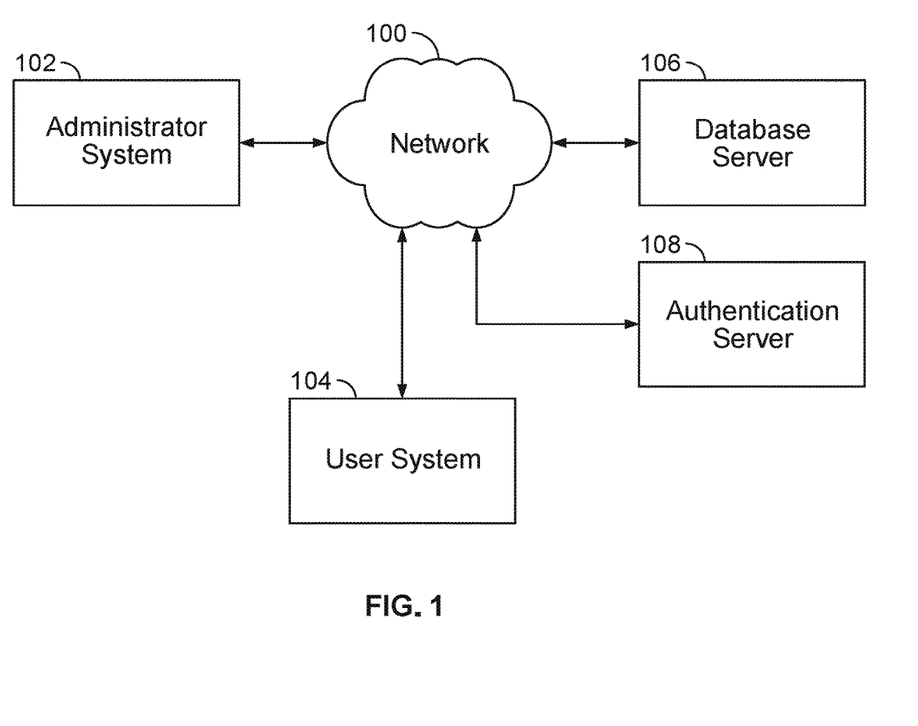
FIG. 1 is a block diagram illustrating an embodiment of a network system.

FIG. 1 is a block diagram illustrating an embodiment of a network system. In some embodiments, the network system of FIG. 1 comprises a system for an object-based database system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, database server 106, and authentication server 108 communicate via network 100. In various embodiments, administrator system 102 comprises a system for an administrator to access data on database server 106, to negotiate authentication using authentication server 108, for executing administrative commands on database server 106, for maintaining database server 106, for executing database applications on database server 106, for modifying applications on database server 106, or for any other appropriate purpose. User system 104 comprises a system for a user. In some embodiments, user system 104 comprises a system for accessing database server 106. In some embodiments, user system 104 comprises a system for negotiating authentication using authentication server 108. Database server 106 comprises a system for managing a database. In some embodiments, database server 106 comprises a system for an object-based database. In some embodiments, database server 106 comprises a system for storing and retrieving data provided by a user (e.g., via user system 104 and network 100). Authentication server 108 comprises a system for authenticating a user of database server 106 (e.g., an administrator system such as administrator system 102, a user system such as user system 104, etc.). In some embodiments, authenticating a user comprises receiving authentication information and determining whether the authentication information is valid. In some embodiments, authenticating a user comprises determining a set of access restrictions that apply to the user. In various embodiments, access restrictions are determined based on a security group associated with the user, based on the network the user is connecting from, based on an authentication type used by the user, or based on any other appropriate access criteria. In some embodiments, authentication server 108 comprises a server for receiving a database server command and determining whether a user has the appropriate access for the database server command to be run under the user's context. In some embodiments, a user provides an indication to the database server to provide authentication server 108 a command or directly provides to authentication server 108 a command to determine whether the user has appropriate access for the database server command to be run under the user's context. In some embodiments, the database server provides authentication server 108 a command automatically (e.g., without a user executing a command and/or without being made aware that the command is executed). In some embodiments, authentication server 108 comprises a server for determining a user does not have access for the database server command to be executed and determining whether the user can upgrade its authentication to have access for the database server command to be executed. In some embodiments, authentication server 108 comprises a system for upgrading authentication of a user after login. In some embodiments, the network system of FIG. 1 comprises a plurality of administrator systems as in administrator system 102. In some embodiments, the network system of FIG. 1 comprises a plurality of user systems as in user system 104. In some embodiments, users using user systems and administrators using administrator systems are associated with different security groups or have different access restrictions policies. In some embodiments, access restrictions comprise a subset of security groups. In some embodiments, subsets of users are associated with different security groups. In some embodiments, subsets of administrators are associated with different security groups.

In various embodiments, administrator system 102, database server 106, and authentication server 108 are implemented using one physical server system (e.g., as virtual systems on the one physical system), are implemented as separate physical systems, are implemented using any other number of physical system(s) with any mapping of administrator system 102, database server 106, and authentication server 108 or portions thereof to the physical system(s).

Figure 2:
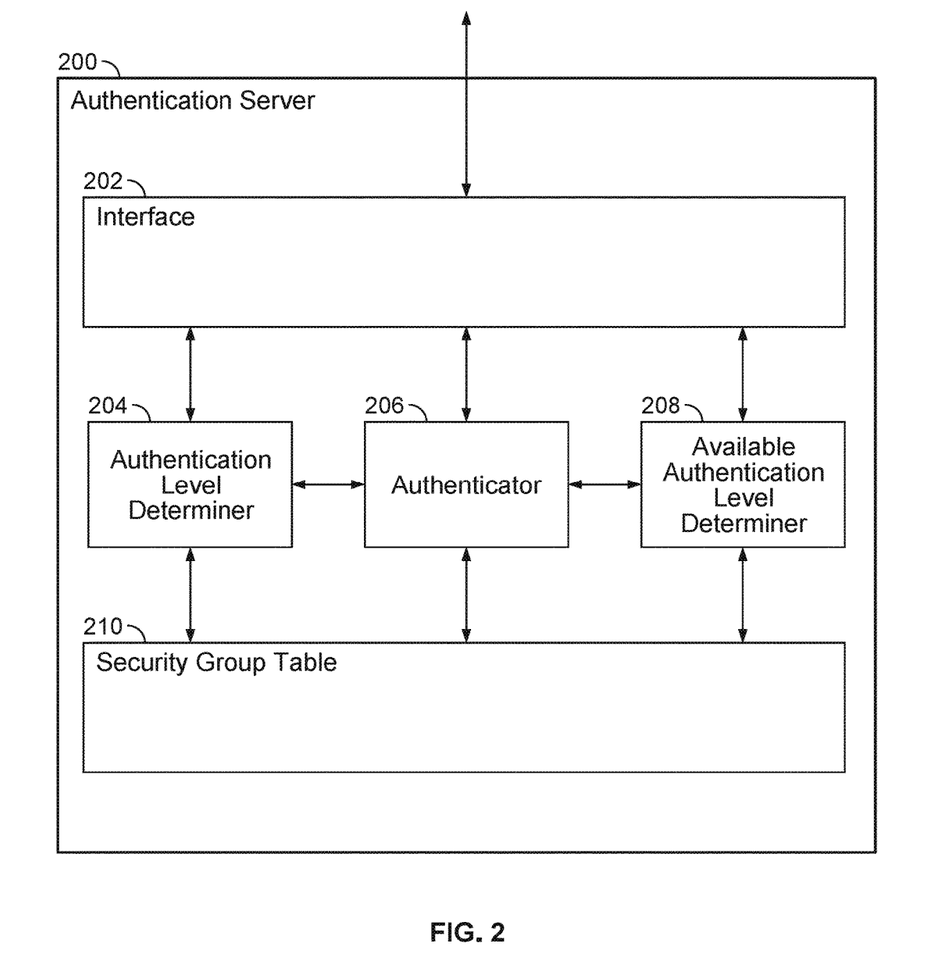
FIG. 2 is a block diagram illustrating an embodiment of an authentication server.

FIG. 2 is a block diagram illustrating an embodiment of an authentication server. In some embodiments, authentication server 200 comprises authentication sever 108 of FIG. 1. In the example shown, authentication server 200 comprises interface 202. In various embodiments, interface 202 comprises an interface for receiving authentication information, providing an authentication decision, receiving a database command associated with a user, receiving network information associated with a user, providing an indication of whether or not a user has access for a database command to be executed, or performing any other appropriate interface function. In some embodiments, interface 200 is implemented using a processor. Authentication level determiner 204 comprises an authentication level determiner for determining an authentication level associated with a user. Authentication level determiner receives a database command associated with a user, determines a security policy associated with the user, determines whether the user has permission for the database command to be executed according to the security policy, and provides the permission decision. Authentication level determiner 204 determines the security policy associated with the user using security group table 210. Authentication level determiner 204 determines a set of security polices available to the user using security group table 210 and determines the security policy the user is presently authenticated for using authenticator 206. In some embodiments, authentication level determiner 204 is implemented using a processor. Authenticator 206 comprises an authenticator for authenticating a user. Authenticator 206 receives authentication information from a user and determines its validity. Authenticator 206 determines a security policy associated with a user using security group table 210. For example, a security policy comprises allowed authentication types, access restrictions, or any other appropriate security policy information. In some embodiments, multiple security policies are associated with a user (e.g., comprising different access restrictions and associated with different authentication types, different access networks, etc.). In some embodiments, some security policies are available to a user upon initial login and some security policies require upgrading authentication after the initial login. In some embodiments, authenticator 206 is implemented using a processor. Available authentication level determiner 208 comprises an available authentication level determiner for determining whether an authentication level is available to a user with the access to perform an action. In some embodiments, in the event it is determined that a user does not have access to perform an action at the user's current authentication level, available authentication level determiner 208 is used to determine whether there is an authentication level the user can switch to that includes access to perform the action. In some embodiments, available authentication level determiner 208 is implemented using a processor. Security group table 210 comprises a table describing security groups. In some embodiments, each system user is associated with a security group. In some embodiments, each security group is associated with a security policy. In some embodiments, a security policy comprises a group of any appropriate number of sets of login conditions (e.g., login network and authentication type) and associated access restrictions. In some embodiments, some sets of login conditions and associated access restrictions are not accessible to a user upon initial login. In some embodiments, security group table 210 is implemented using a processor. In various embodiments, the elements of authentication server 200 are each implemented on separate processors, are all implemented on a single processor, or are implemented on a set of processors in any other appropriate way.

In some embodiments, in the event that a user does not have privilege to perform an action (e.g., while currently authenticated at a given level), one or more authentication levels (e.g., an authentication level different from the current level) are determined that do have privilege to perform the action that the user would be able to access after further authentication. In some embodiments, the lowest level of the one or more levels is provided for authentication for the user to be able to perform the action. In some embodiments, a choice is offered to the user to determine which level the user wishes to authenticate at. In some embodiments, the highest level of the one or more levels is provided for authentication for the user.

Figure 3:
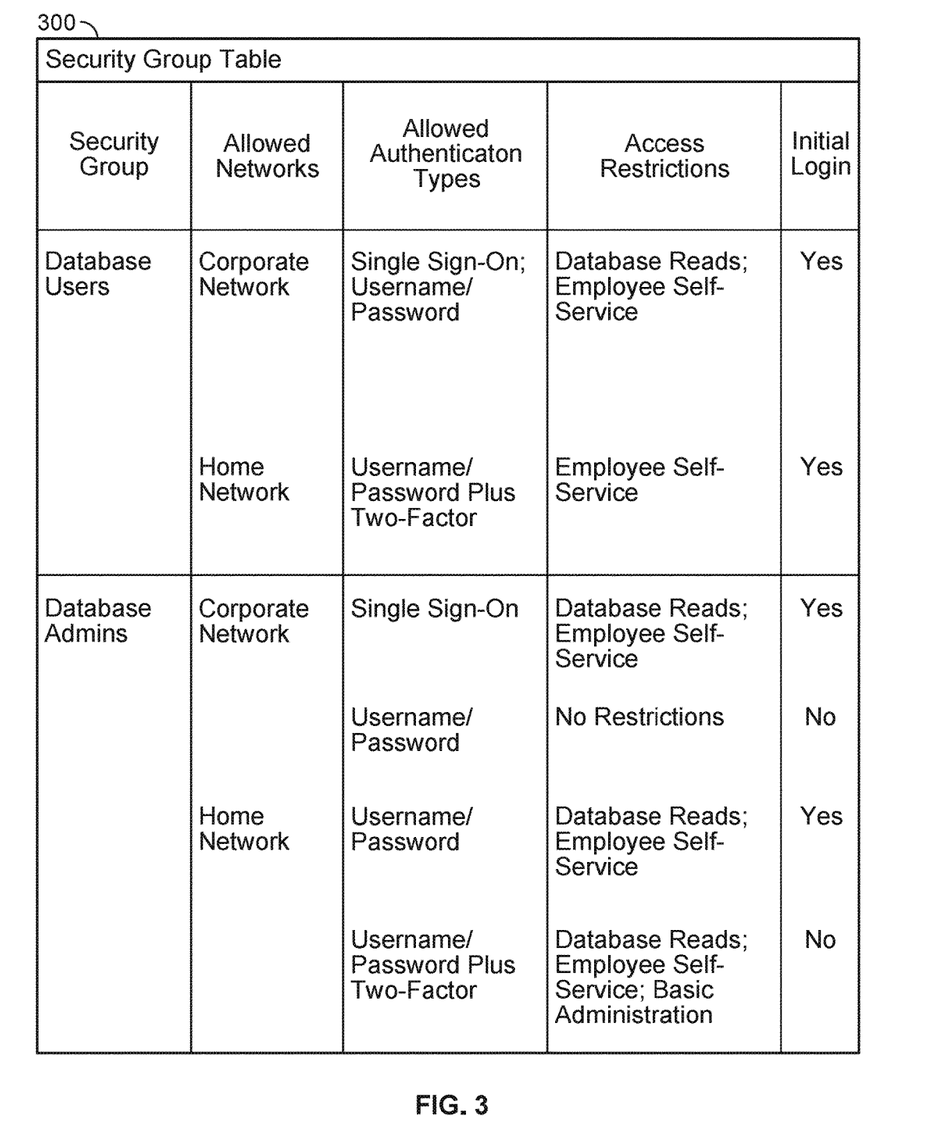
FIG. 3 is a diagram illustrating an embodiment of a security group table.

FIG. 3 is a diagram illustrating an embodiment of a security group table. In some embodiments, security group table 300 implements security group table 210 of FIG. 2. In the example shown, security group table 300 comprises security policies for two security groups, database users and database administrators. In some embodiments, security group table 300 comprises any appropriate number of security groups, comprising affiliated users divided in any other appropriate way. Each security group comprises separate security policies for logins from the corporate network and the home network of the users. In some embodiments, logins from networks other than those specified in "Allowed Networks" are not allowed. In the example shown, database users accessing the database via the corporate network are allowed to login using a single sign-on authentication (e.g., authentication using a stored single sign-on authentication token) or a username and password. Database users accessing the database via the corporate network are only allowed to perform database reads and employee self-service (e.g., updating their personal information—for example, address information, tax information, family information, insurance information, etc.). This security policy is available to database users upon initial login. Database users accessing the database from their home network are required to login using a username and password plus a two-factor authentication correlator (e.g., after entering their username and password, the employee is sent a code by text message to a stored phone number and is required to enter the code to login). When a database user successfully logs in from their home network, they only have access to employee self-service and no other parts of the database. This security policy is available to database users at the initial login. In some embodiments, an additional level of authentication is available to a database user accessing the network from a home network in order to grant the user access to database reads.

In some embodiments, database administrators accessing the database from the corporate network are able to log in initially using only a single sign-on authentication. At this basic level of authentication, the administrator has no administrative access, only access to database reads and employee self-service. This security policy is available to database administrators at the initial login. Database administrators accessing the database from the corporate network wishing to gain administrative access must upgrade their authentication using a username and password. Having upgraded access in this way, there are no access restrictions for the administrator. This security policy is not available to a database administrator upon initial login and can only be accessed by logging in with a lower security policy and upgrading. In some embodiments, a database administrator does not directly upgrade their security policy but interacts with the database as though they have all the permissions required for their desired actions. When an administrator makes an action without the required permissions, an authentication server determines that they do not have the permissions for the action and that there is a higher security policy that they can change to that does have the permissions for the action, and prompts the administrator for authentication for the higher security policy. Upon successfully authenticating the higher security policy, the administrator action is executed. A database administrator accessing the database via their home network can login initially using a lower level authentication (e.g., a username and password) for access to database reads and employee self-service. In the event that administrator action(s) is/are desired, basic administration access can be gained by using a higher level authentication (e.g., a two-factor authentication).

Figure 4:
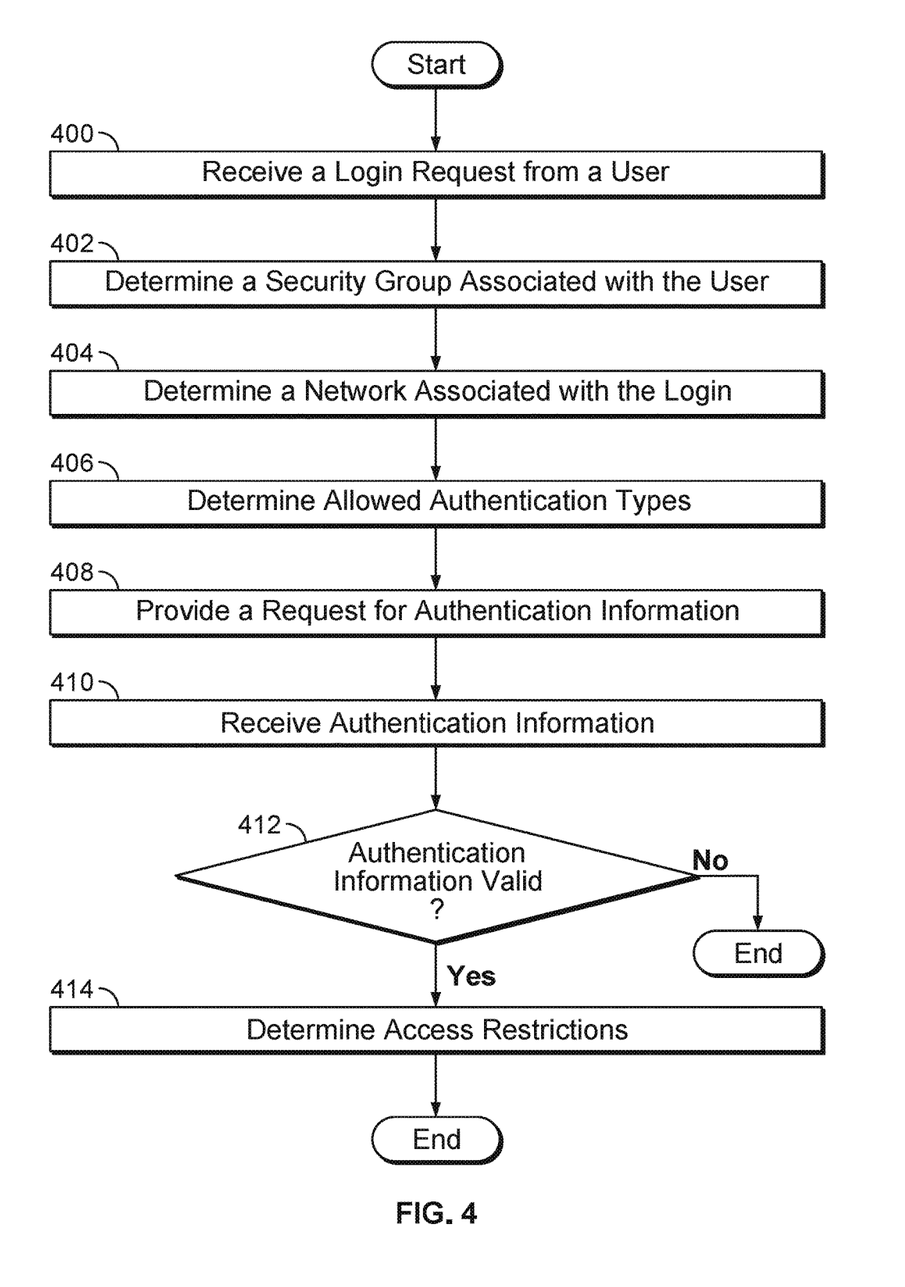
FIG. 4 is a flow diagram illustrating an embodiment of a process for login using security group authentication.

FIG. 4 is a flow diagram illustrating an embodiment of a process for login using security group authentication. In some embodiments, the process of FIG. 4 is performed by an authentication server (e.g., authentication server 200 of FIG. 2). In the example shown, in 400, a login request from a user is received. In 402, a security group associated with the user is determined. For example, a security group is determined from a security group table, by information provided associated with the login request, by querying user information, or in any other appropriate way. In 404, a network associated with the login is determined. For example, a network associated with the login is determined from the login request. In 406, allowed authentication types are determined. For example, allowed authentication types are determined from a security group table. In 408, a request is provided for authentication information. For example, authentication information of the type determined in 406. In 410, authentication information is received. In 412, it is determined whether the authentication information is valid. In the event it is determined that the authentication information is not valid, the process ends. In some embodiments, multiple login attempts are allowed before the login process is abandoned. In the event it is determined in 412 that the authentication information is valid, control passes to 414. In 414, access restrictions are determined (e.g., from a security group table).

Figure 5:
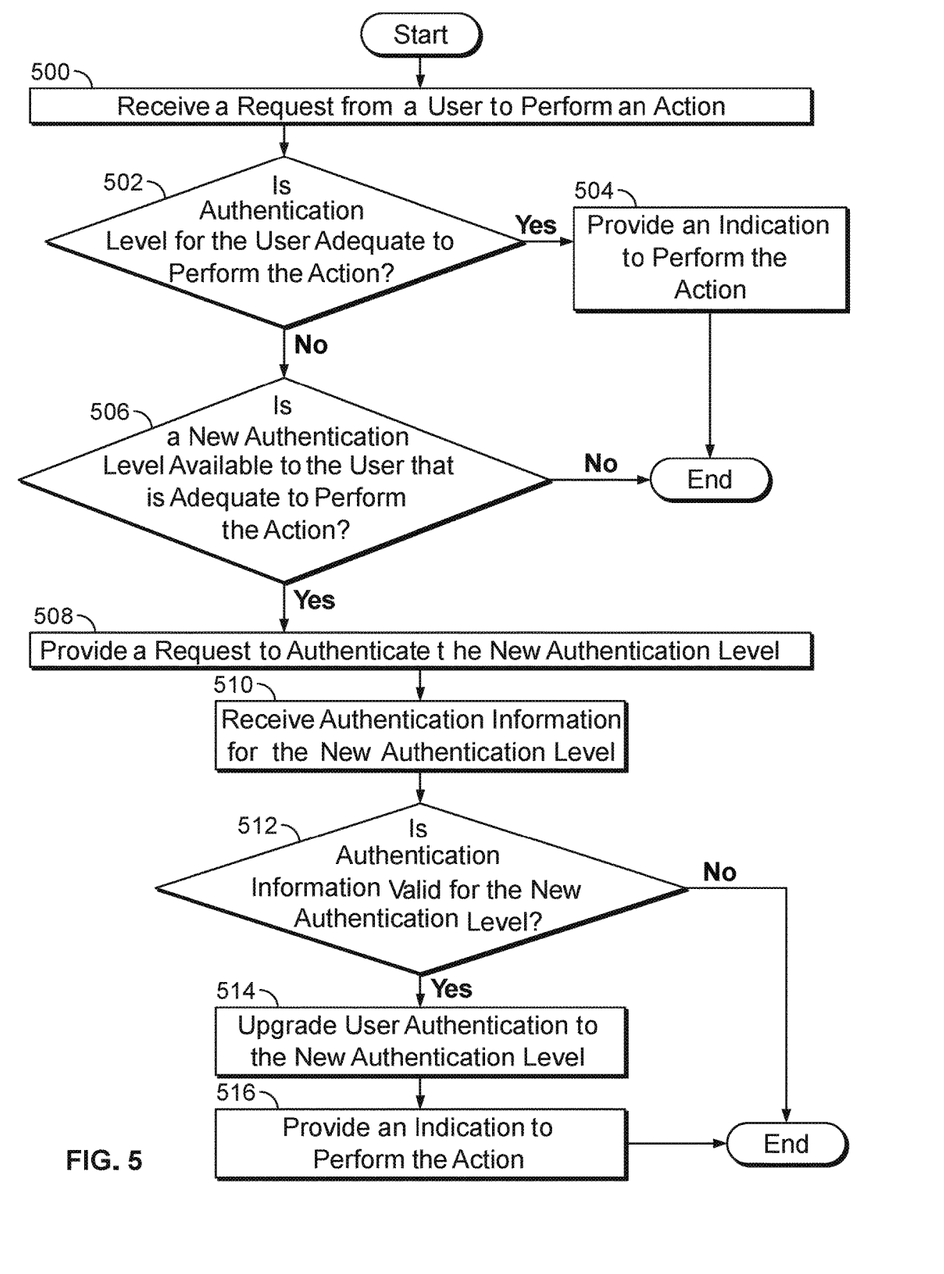
FIG. 5 is a flow diagram illustrating an embodiment of a process for authenticating a request to perform an action.

FIG. 5 is a flow diagram illustrating an embodiment of a process for authenticating a request to perform an action. In some embodiments, the process of FIG. 5 is performed by an authentication server (e.g., authentication server 200 of FIG. 2). In the example shown, in 500, a request from a user to perform an action is received. For example, a user requests an action regarding a database action (e.g., viewing data, modifying data, performing administrative actions, etc.). In 502, it is determined whether the authentication level for the user is adequate to perform the action. For example, it is determined whether the authentication level for the user is adequate to perform the action by an authentication level determiner. The user's privileges are determined (e.g., a user's security group is determined and then a table is checked for the privileges associated with the security group). In the event it is determined that the authentication level for the user is adequate to perform the action, control passes to 504. In 504, an indication to perform the action is provided (e.g., to a database server), and the process ends. In the event it is determined that the authentication level for the user is not adequate to perform the action, control passes to 506. In 506, it is determined whether a new authentication level available to the user is adequate to perform the action. For example, whether a new authentication level available to the user is adequate to perform the action is determined by an available authentication level determiner. In some embodiments, one or more security groups are available to a given user and one or more security groups of the available is/are checked for privilege level that would allow a user to perform the action. In some embodiments, the security groups are checked from lowest privileges to highest privileges. In some embodiments, the checking stops as soon as at least one security group allows the action to be performed. In some embodiments, all available security groups are checked. In some embodiments, the highest level is determined and only the highest level is checked. In the event it is determined that there is not a new authentication level available to the user that is adequate to perform the action, the process ends. In some embodiments, an indication is provided to the user that no available authentication levels are adequate to perform the action. In the event it is determined in 506 that a new authentication level available to the user is adequate to perform the action, control passes to 508. In 508, a request is provided to authenticate the new authentication level. For example, the user is prompted to authenticate to a new level (e.g., at least one level that would authorize performance of the action). In various embodiments, the request is for the lowest level available to perform the action, the highest level available, all available, or any other appropriate request. In some embodiments, the user is asked to determine which of multiple levels that are able to perform the action are to be authenticated. In some embodiments, the request is provided by an authenticator. In some embodiments, providing a request to authenticate the new authentication level comprises providing a request for authentication information (e.g., to a user). In 510, authentication information for the new authentication level is received. In 512, it is determined whether the authentication information is valid for the new authentication level. In the event it is determined that the authentication information is not valid for the new authentication level, the process ends. In the event it is determined that the authentication information is valid for the new authentication level, control passes to 514. In 514, a user authentication is upgraded to the new authentication level. In various embodiments, upgrading user authentication comprises storing that the user has authenticated the new authentication level, changing a set of access restrictions, or any other appropriate change in user authentication. In various embodiments, the user authentication upgrade lasts until the user logs out, for a predetermined time period, for the duration of time necessary to perform the action, or for any other appropriate period of time. In 516, an indication to perform the action is provided (e.g., to a database server).

Figure 6:
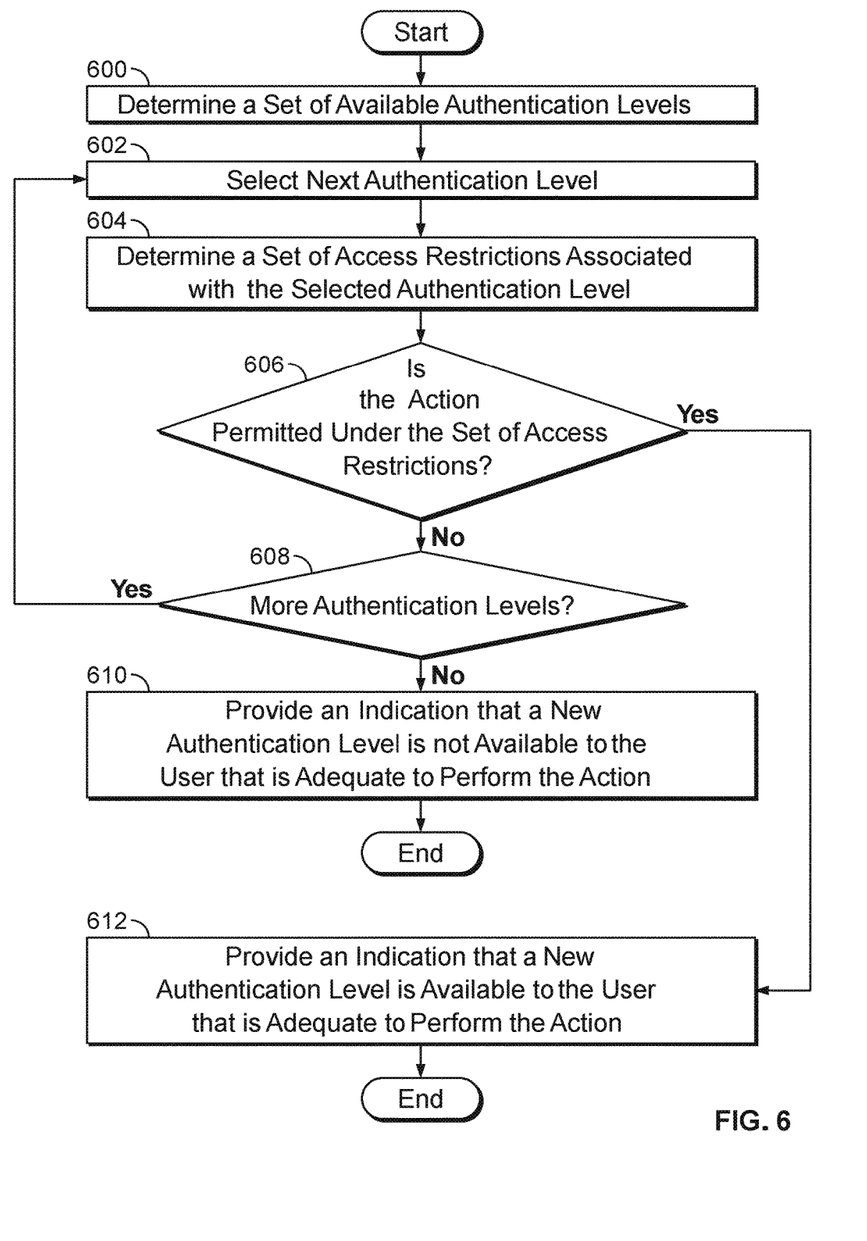
FIG. 6 is a flow diagram illustrating an embodiment of a process for determining whether a new authentication level available to a user is adequate to perform an action.

FIG. 6 is a flow diagram illustrating an embodiment of a process for determining whether a new authentication level available to a user is adequate to perform an action. In some embodiments, the process of FIG. 6 implements 506 of FIG. 5. In some embodiments, the process of FIG. 6 is executed by available authentication level determiner 208 of FIG. 2. In the example shown, in 600, a set of available authentication levels is determined. In some embodiments, a set of available authentication levels is determined from a security policy (e.g., the security policy associated with the security group associated with the user). In 602, the next authentication level is selected. In some embodiments, the next authentication level comprises the first authentication level. In 604, a set of access restrictions associated with the selected authentication level is determined. In 606, it is determined whether the action is permitted under the set of access restrictions. In the event it is determined that the action is permitted under the set of access restrictions, control passes to 612. In 612, an indication is provided that a new authentication level is available to the user that is adequate to perform the action. In some embodiments, an indication of the authentication level that is available to the user that is adequate to perform the action is provided. The process then ends. In the event it is determined in 606 that the action is not permitted under the set of access restrictions, control passes to 608. In 608, it is determined whether there are more authentication levels. In the event it is determined that there are more authentication levels, control passes to 602. In the event it is determined that there are not more authentication levels, control passes to 610. In 610, an indication is provided that a new authentication level is not available to the user that is adequate to perform the action.

In some embodiments, the process of FIG. 6 is modified to determine more than one authentication level that is able to perform the action. For example, after 612 it is determined whether there are more authentication levels and in the event that there are control passes to 602.

In some embodiments, the process of FIG. 6 is modified to hierarchically rank the set of available authentication levels in 600. In various embodiments, selection of the next authentication level in 602 is from top to bottom of the hierarchy, from bottom to top, randomly, or in any other appropriate order.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for security group authentication comprising:
an interface for receiving a request from a user to perform an action;
a hardware processor configured for:
determining that a current authentication level for the user is not adequate to perform the action based at least in part on a current authentication type associated with the user, comprising:
determining whether the action is permitted under a first set of access restrictions associated with the current authentication type associated with a security group associated with the user, wherein the first set of access restrictions is associated with a first security group, wherein a second set of access restrictions is associated with a second security group, wherein each factor associated with the first security group is the same or is more restrictive than each corresponding factor of the second security group, wherein a factor associated with the first security group is more restrictive than a corresponding factor of the second security group, and wherein the security group is determined based on the following factors:
whether the user is an administrative user or a basic user, the basic user being more restrictive than the administrative user;

a network associated with a login of the user from a login request, the network being a corporate network or a home network, the home network being more restrictive than the corporate network; and an allowed authentication type, the allowed authentication types including at least two of the following in order of most restrictive to least restrictive: username and password, single sign-on authentication, certificate authentication, or required two-factor authentication;

and in response to a determination that the action is not permitted under the first set of access restrictions, determining that the current authentication level for the user is not adequate to perform the action, comprising:

determining that the action is not permitted in response to a determination that the network is the home network and the user is logged in with the current authentication type;

determining that a new authentication level for the user is adequate to perform the action, wherein the new authentication level for the user is associated with a different authentication type, wherein allowed authentication types associated with the security group include the current authentication type and a new authentication type, and wherein the determining that the new authentication level for the user is adequate to perform the action comprises:

determining whether the action is permitted under the second set of access restrictions associated with the different authentication type associated with the security group associated with the user; and in response to a determination that the action is permitted under the second set of access restrictions, determining that the new authentication level for the user is adequate to perform the action, comprising:

performing one or more of the following:
logging onto the corporate network using the current authentication type to obtain the new authentication level to perform the action using the corporate network; or
upgrading, via the home network, the current authentication type to a more restrictive authentication type by performing the new authentication type to obtain the new authentication level to perform the action using the home network;

providing a request to authenticate the new authentication level to the user, wherein the current authentication level and the new authentication level are associated with the security group; and in response to a determination that authentication information is valid for the different authentication type, permitting the user to perform the action.

2. The system of claim 1, wherein determining that the current authentication level for the user is not adequate for the action is based at least in part on the network associated with the user.

3. The system of claim 1, wherein the security group comprises a set of authentication levels.

4. The system of claim 1, wherein the hardware processor is further configured for receiving the authentication information.

5. The system of claim 4, wherein the hardware processor is further configured for determining whether the authentication information is valid for the new authentication level.

6. The system of claim 5, wherein the processor is further configured for in response to a determination that the authentication information is not valid for the new authentication level, indicating that the new authentication level is not accessible.

7. The system of claim 5, wherein the processor is further configured for in response to a determination that the authentication information is valid for the new authentication level, indicating that the new authentication level is accessible.

8. The system of claim 7, wherein the processor is further configured for in response to a determination that the authentication information is valid for the new authentication level, upgrading a user authentication to the new authentication level.

9. The system of claim 8, wherein the processor is further configured for in response to a determination that the authentication information is valid for the new authentication level, providing an indication that the new authentication level is adequate for the action.

10. The system of claim 1, wherein the determining that a new authentication level for the user is adequate for the action is based at least in part on a set of access restrictions.

11. A method for security group authentication, comprising:

receiving a request from a user to perform an action;
determining, using a hardware processor, that a current authentication level for the user is not adequate to perform the action based at least in part on a current authentication type associated with the user, comprising:

determining whether the action is permitted under a first set of access restrictions associated with the current authentication type associated with a security group associated with the user, wherein the first set of access restrictions is associated with a first security group, wherein a second set of access restrictions is associated with a second security group, wherein each factor associated with the first security group is the same or is more restrictive than each corresponding factor of the second security group, wherein a factor associated with the first security group is more restrictive than a corresponding factor of the second security group, and wherein the security group is determined based on the following factors:

whether the user is an administrative user or a basic user, the basic user being more restrictive than the administrative user;
a network associated with a login of the user from a login request, the network being a corporate network or a home network, the home network being more restrictive than the corporate network; and
an allowed authentication type, the allowed authentication types including at least two of the following in order of most restrictive to least restrictive: username and password, single sign-on authentication, certificate authentication, or required two-factor authentication; and in response to a determination that the action is not permitted under the first set of access restrictions, determining that the current authentication level for the user is not adequate to perform the action, comprising:

determining that the action is not permitted in response to a determination that the network is the home network and the user is logged in with the current authentication type;
determining that a new authentication level for the user is adequate to perform the action, wherein the new authentication level for the user is associated with a different authentication type, wherein allowed authentication types associated with the security group include the current authentication type and a new authentication type, and wherein the determining that the new authentication level for the user is adequate to perform the action comprises:
determining whether the action is permitted under the second set of access restrictions associated with the different authentication type associated with the security group associated with the user; and
in response to a determination that the action is permitted under the second set of access restrictions, determining that the new authentication level for the user is adequate to perform the action, comprising:
performing one or more of the following:
logging onto the corporate network using the current authentication type to obtain the new authentication level to perform the action using the corporate network; or
upgrading, via the home network, the current authentication type to a more restrictive authentication type by performing the new authentication type to obtain the new authentication level to perform the action using the home network;
providing a request to authenticate the new authentication level to the user, wherein the current authentication level and the new authentication level are associated with the security group; and
in response to a determination that authentication information is valid for the different authentication type, permitting the user to perform the action.

12. A computer program product for security group authentication, the computer program product being embodied in a non-transitory computer readable storage medium and comprising computer instructions for:
receiving a request from a user to perform an action;
determining, using a hardware processor, that a current authentication level for the user is not adequate to perform the action based at least in part on a current authentication type associated with the user, comprising:
determining whether the action is permitted under a first set of access restrictions associated with the current authentication type associated with a security group associated with the user, wherein the first set of access restrictions is associated with a first security group, wherein a second set of access restrictions is associated with a second security group, wherein each factor associated with the first security group is the same or is more restrictive than each corresponding factor of the second security group, wherein a factor associated with the first security group is more restrictive than a corresponding factor of the second security group, and wherein the security group is determined based on the following factors:
whether the user is an administrative user or a basic user, the basic user being more restrictive than the administrative user;
a network associated with a login of the user from a login request, the network being a corporate network or a home network, the home network being more restrictive than the corporate network; and
an allowed authentication type, the allowed authentication types including at least two of the following in order of most restrictive to least restrictive: username and password, single sign-on authentication, certificate authentication, or required two-factor authentication; and
in response to a determination that the action is not permitted under the first set of access restrictions, determining that the current authentication level for the user is not adequate to perform the action, comprising:
determining that the action is not permitted in response to a determination that the network is the home network and the user is logged in with the current authentication type;
determining that a new authentication level for the user is adequate to perform the action, wherein the new authentication level for the user is associated with a different authentication type, wherein allowed authentication types associated with the security group include the current authentication type and a new authentication type, and wherein the determining that the new authentication level for the user is adequate to perform the action comprises:
determining whether the action is permitted under the second set of access restrictions associated with the different authentication type associated with the security group associated with the user; and
in response to a determination that the action is permitted under the second set of access restrictions, determining that the new authentication level for the user is adequate to perform the action, comprising:
performing one or more of the following:
logging onto the corporate network using the current authentication type to obtain the new authentication level to perform the action using the corporate network; or
upgrading, via the home network, the current authentication type to a more restrictive authentication type by performing the new authentication type to obtain the new authentication level to perform the action using the home network;
providing a request to authenticate the new authentication level to the user, wherein the current authentication level and the new authentication level are associated with the security group; and
in response to a determination that authentication information is valid for the different authentication type, permitting the user to perform the action.

* * * * *